(12) United States Patent
Jane Santamaria

(10) Patent No.: US 7,726,737 B2
(45) Date of Patent: Jun. 1, 2010

(54) INFANT SEAT FOR MOTORCARS

(75) Inventor: Manuel Jane Santamaria, Palau Solita I Plegamans (ES)

(73) Assignee: Jane S.A., Barcelona (ES)

( * ) Notice: Subject to any disclaimer, the term of this patent is extended or adjusted under 35 U.S.C. 154(b) by 0 days.

(21) Appl. No.: 12/265,425

(22) Filed: Nov. 5, 2008

(65) Prior Publication Data

US 2009/0160233 A1    Jun. 25, 2009

(30) Foreign Application Priority Data

Dec. 21, 2007    (ES)    ............................. 200702649 U

(51) Int. Cl.
*B60N 2/26* (2006.01)
(52) U.S. Cl. .................................................. 297/253
(58) Field of Classification Search ............... 297/253, 297/250.1, 216.11, 252; 248/503, 503.1
See application file for complete search history.

(56) References Cited

U.S. PATENT DOCUMENTS

| | | | | |
|---|---|---|---|---|
| 5,466,044 | A * | 11/1995 | Barley et al. ................. | 297/252 |
| 6,375,260 | B1 * | 4/2002 | Hiramatsu et al. ..... | 297/256.16 |
| 6,663,174 | B2 * | 12/2003 | Drage et al. ................. | 297/112 |
| 6,764,135 | B2 * | 7/2004 | Sasaki et al. ........... | 297/256.16 |
| 6,834,915 | B2 * | 12/2004 | Sedlack .................. | 297/256.13 |
| 7,328,946 | B2 * | 2/2008 | Hendrikus Van Montfort et al. .......................... | 297/253 |
| 7,467,825 | B2 * | 12/2008 | Jane Santamaria .......... | 297/253 |
| 7,488,034 | B2 * | 2/2009 | Ohren et al. ........... | 297/216.11 |
| 7,618,093 | B2 * | 11/2009 | Hung-Chung ............... | 297/253 |
| 2001/0010431 | A1 | 8/2001 | Sasaki et al. | |
| 2005/0236877 | A1 * | 10/2005 | Hendren et al. .......... | 297/250.1 |
| 2006/0197364 | A1 * | 9/2006 | Bendure et al. ........ | 297/256.12 |
| 2008/0303321 | A1 * | 12/2008 | Powell ................... | 297/216.11 |

FOREIGN PATENT DOCUMENTS

| | | |
|---|---|---|
| EP | 1 714 826 | 10/2006 |
| EP | 1 880 893 | 1/2008 |

* cited by examiner

*Primary Examiner*—Milton Nelson, Jr.
(74) *Attorney, Agent, or Firm*—Merchant & Gould P.C.

(57) ABSTRACT

An infant seat for motorcars includes anchor being operable to engage a receiving element being provided in the motorcar. The infant seat has a framework fixedly attached to the lower face of the base of the seat and is fitted with the anchor, the anchor being actuated by a pneumatic device being fitted to the framework and actuated by a control being made up by an articulated lever, the control being accessible through the front edge of the base of the seat, the manual controls being operable for deactivating the anchor being found at the front edge.

6 Claims, 1 Drawing Sheet

INFANT SEAT FOR MOTORCARS

This application claims benefit of Serial No. ES 200702649U, filed 21 Dec. 2007 in Spain and which application is incorporated herein by reference. To the extent appropriate, a claim of priority is made to the above disclosed application.

BACKGROUND OF THE INVENTION

There exist several means for securedly fitting the infant seats to the motorcars, from among them being known the mechanical connectors being made up by two anchoring elements being fitted to the base of the seat and arranged in a backwardly projecting arrangement, said anchoring elements being designed to engage an element being solid with the motorcar, from among the aforementioned mechanical connectors there existing those being known as of the "isofix" type.

SUMMARY OF THE INVENTION

The invention has as its object an infant seat for motorcars which is prepared to directly come into engagement with the safety means being provided in the motorcar by using the anchoring system of the "isofix" type, said engagement being obtained in a simple and highly safe manner.

Said seat comprises a framework being fixedly attached to the lower face of its base and in a rearward position being fitted with the anchoring means, these latter being actuated by means of a pneumatic device being fitted to said framework and actuated by means of a control being accessible through the front edge of the base of the seat. control being accessible through the front edge of the base of the seat.

At the front edge of said base the manual controls are also to be found which are operable for deactivating the mechanism of the anchoring means.

The body of the pneumatic device is at its actuating end solid with a transversal carrier being fitted at its ends to the anchoring means, each of these latter being guidedly slidable in a respective box being solid with the respective side of the framework.

These and other characterising features will be best made apparent by the following detailed description whose understanding will be made easier by the accompanying sheet of drawings showing a practical embodiment being cited only by way of example not limiting the scope of the present invention.

DETAILED DESCRIPTION OF PREFERRED EMBODIMENTS

Figure 1:
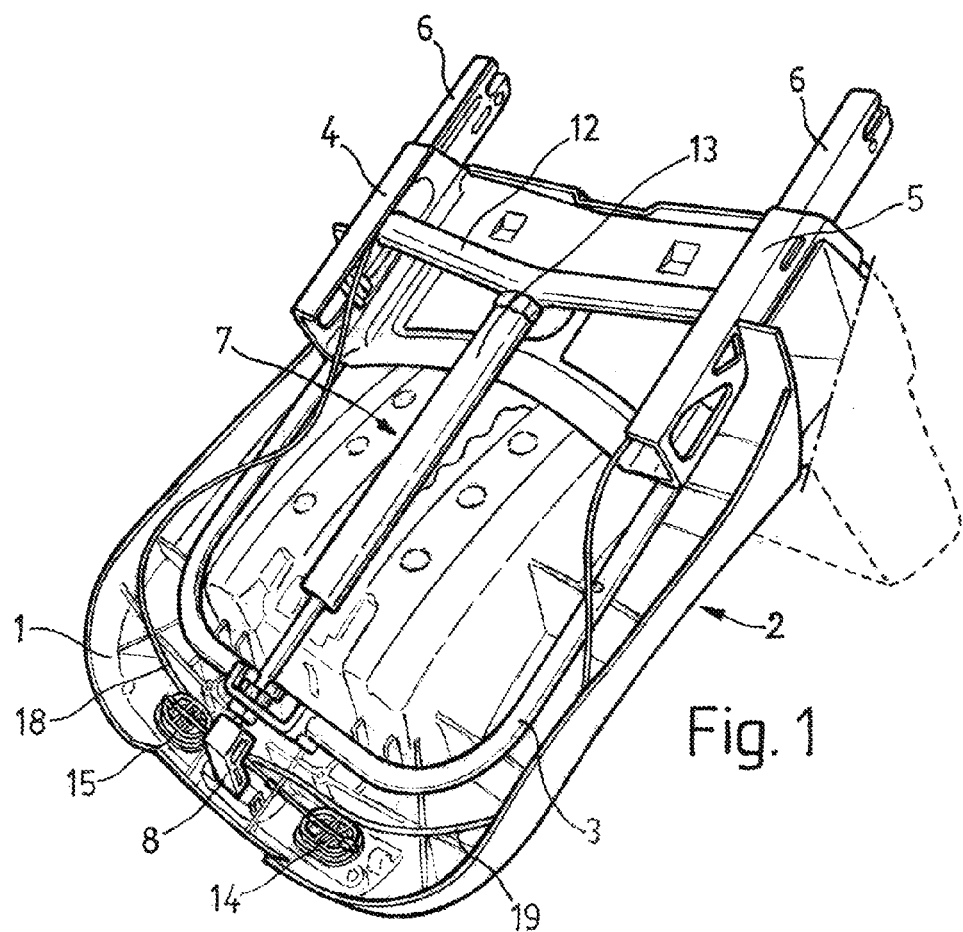
FIG. 1 illustrates in a perspective view the base of the seat as seen from below its lower face and showing the anchoring means.
Figure 2:
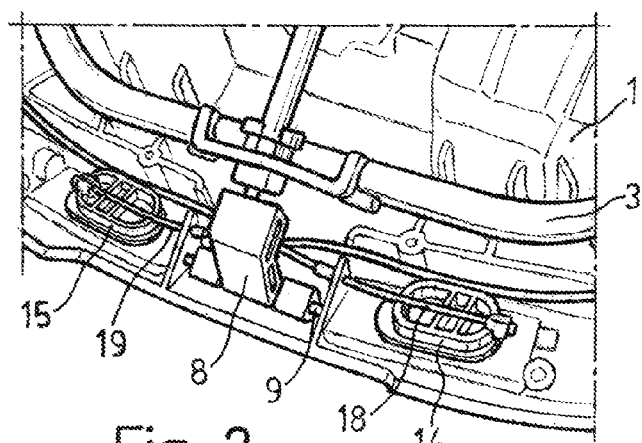
FIG. 2 shows in a perspective view a detail of the controls as seen from behind their rearward portion.
Figure 3:
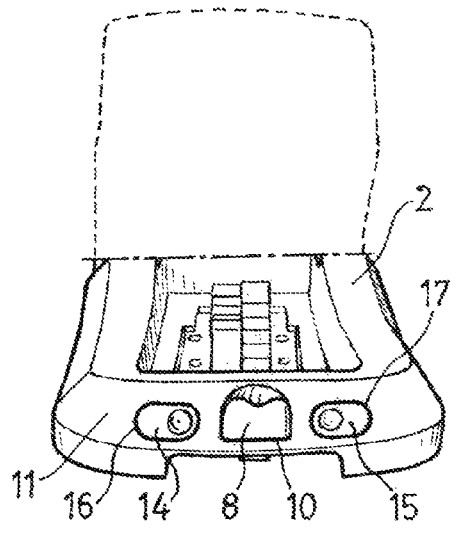
FIG. 3 is a front perspective view of the base of the seat.

According to the drawings the infant seat for motorcars comprises a framework (3) being fixedly attached to the lower face (1) of its base (2) and in its rearward portion being integrally provided with respective lateral boxes (4 and 5) slidably housing the anchoring means (6) of the "isofix" type, these latter comprising a locking mechanism being operable to engage a metal rod being solid with the motorcar.

These anchoring means (6) are actuated by means of a pneumatic device (7) being fitted to the framework (3) and preferentially made up by a lockable gas spring being actuated by a control (8) being made up by a lever being linked in a pin-jointed connection and by means of pin (9) to the base (2), said control being accessible through an opening (10) being provided in the front edge (11) of the base (2).

The action of the pneumatic device (7) on the anchoring means (6) is carried out through a transversal carrier (12) being solid with the actuating end of the body (13) of the pneumatic device, the anchoring means (6) being fitted to the ends of said transversal carrier.

At the front edge (11) of the base the controls (14 and 15) are also to be found which are operable for deactivating the mechanism of the anchoring means (6), said controls being each made up by a respective sliding piece being accessible through a respective opening (16 and 17) and linked to the anchoring means by means of a corresponding rope (18 and 19).

The infant seat will be fitted on top of the base (2) and has not been depicted because it can be any of the conventional ones, or else it can be especially created for said base.

The invention claimed is:

1. An infant seat for motorcars comprises: anchoring means being operable to engage a receiving element provided in the motorcar; a framework fixedly attached to a lower face of a base of the seat and is fitted with the anchoring means; wherein the anchoring means are actuated by a pneumatic device fitted to said framework and actuated by a control accessible through a front edge of the base of the seat.

2. An infant seat for motorcars, as claimed in claim 1, wherein at the front edge of the base of the seat and on top of the control, the seat further comprises an articulated lever operable for actuating the pneumatic device and manual controls which are operable for deactivating the anchoring means.

3. An infant seat for motorcars, as claimed in claim 2, wherein the manual controls being operable for deactivating the anchoring means each comprise a respective sliding piece linked to the corresponding anchoring means by a respective line.

4. An infant seat for motorcars, as claimed in claim 1, wherein the anchoring means are each guidedly slidable in a respective box being solid with the respective side of the framework.

5. An infant seat for motorcars, as claimed in claim 1, wherein a body of the pneumatic device is at an actuating end solid with a transverse carrier fitted at its ends to the anchoring means.

6. An infant seat for motorcars, as claimed in claim 1, wherein the pneumatic device comprises a lockable gas spring.

* * * * *